No. 700,156. Patented May 13, 1902.
R. J. SIMPSON.
DRAFTSMAN'S SCALE.
(Application filed Apr. 5, 1900.)

(No Model.)

Witnesses:
R. Henry Marsh.
J. J. Daly.

Inventor,
Robert J. Simpson.
by H. H. Bennett
Atty

UNITED STATES PATENT OFFICE.

ROBERT J. SIMPSON, OF ATHOL, MASSACHUSETTS, ASSIGNOR TO THE L. S. STARRETT COMPANY, OF ATHOL, MASSACHUSETTS, A CORPORATION OF MASSACHUSETTS.

DRAFTSMAN'S SCALE.

SPECIFICATION forming part of Letters Patent No. 700,156, dated May 13, 1902.

Application filed April 5, 1900. Serial No. 11,589. (No model.)

*To all whom it may concern:*

Be it known that I, ROBERT J. SIMPSON, of Athol, in the county of Worcester and State of Massachusetts, have invented certain new and useful Improvements in Draftmen's Scales, of which the following is a specification.

The object of this invention is to provide for the use of mechanical draftsmen a tilting graduated straight-edge or scale so constructed that either edge of each face may rest closely down to the surface of the paper, bringing the lines indicating longitudinal measurements into immediate proximity to the surface of the paper and holding the scale at a desired inclination with one edge elevated.

The characteristic peculiarity of my improved scale consists in providing it with studs located in the line of its transverse center and projecting from each side of the scale-body, so as to hold such body at an angle to the horizon and permit it to be tipped from side to side and to bring either edge of either side to rest upon the paper. These studs are located at the ends of the scale, preferably just beyond the graduated portion of the instrument, and the ends of said studs are rounded or tapered, so as to tilt readily without indentation of the paper.

Figure 1:
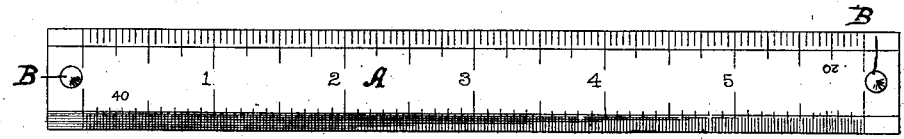
Figure 2:
Figure 3:
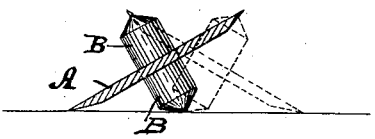

In the drawings, Figures 1 and 2 are plan views showing opposite sides of the instrument, illustrating four different graduations or scales of measurement. Fig. 3 is an enlarged transverse section of the scale, dotted lines indicating the change of position by the tilting movement.

A represents the scale-body, a flat steel strip beveled at the edges of one face and graduated along each edge of both faces in a manner well known.

B B are studs projecting from each face and near each end of the body A at points about midway between the edges. The studs at each end of the scale are preferably formed of a single cylindrical pin pressed into a perforation and firmly secured in the metal body and protruding equidistantly each side thereof sufficiently to hold it in the oblique position with either edge resting down upon the paper. The ends are preferably rounded, as shown in Fig. 3, and located in the plain or ungraduated spaces at the ends of the scale, as shown in Figs. 1 and 2.

In use the scale tips sidewise to the proper angle, bringing the graduated edges to the paper in four different positions, and it will be held by gravity in the position in which it may be placed. The edge being elevated, the instrument may be readily removed without touching the paper.

I am aware that triangular scales have long been known, presenting a surface oblique to the paper, and also that scales have been made having a leg or scroll projecting from one edge of the body to hold it in a single oblique position, but rendering the other faces inoperative. I am also aware of the Patent No. 585,738 to Brittain, showing a ruler slotted centrally to receive the corresponding end of a peculiar handle-piece projecting through such slot and fixed therein. Such construction I disclaim; but

I claim as my invention—

1. The improved tilting scale, comprising the body A having a middle portion graduated at the edges, and blank or ungraduated portions at the ends, and the studs B projecting centrally and equidistantly from said blank portions at each end of said scale, substantially as set forth.

2. The draftsman's tilting ruler or scale comprising a flattened body having a central graduated portion and blank or ungraduated portions at the ends, and transverse studs set in perforations in such blank portions and extending laterally and equidistantly therefrom on each side of said ruler, substantially as set forth.

3. A draftsman's ruler or scale comprising a flattened body having an intermediate portion graduated at the edges and a blank or ungraduated space at each end, and transverse studs passing through central perforations in said ungraduated spaces and extending laterally upon each side of said ruler, to support the same in an inclined position, substantially as set forth.

4. A draftsman's tilting ruler or scale, comprising a flattened body having graduated edges and perforated at each end midway between said edges, and with rigid supporting studs or pins inserted in such perforations and extending outwardly on each side of said body to a distance equal to about half the width of the scale, so as, when used either side up, to maintain either edge in contact with the work by gravity, substantially as set forth.

In testimony whereof I have affixed my signature in presence of two witnesses.

ROBERT J. SIMPSON.

Witnesses:
L. S. STARRETT,
FRANK E. WING.